June 30, 1931.  A. E. RUTTER  1,812,061
TUCKER FOR HAY PRESSES
Filed Jan. 3, 1928
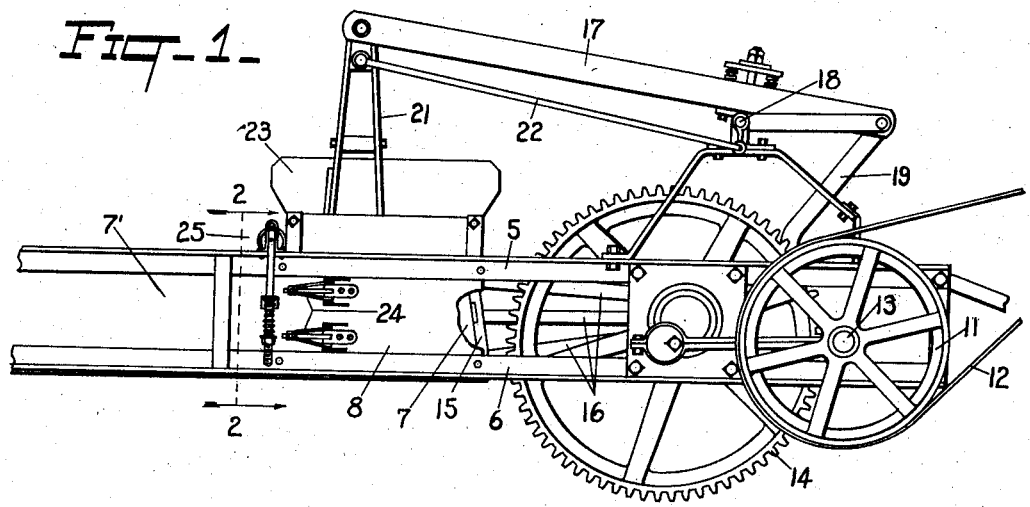
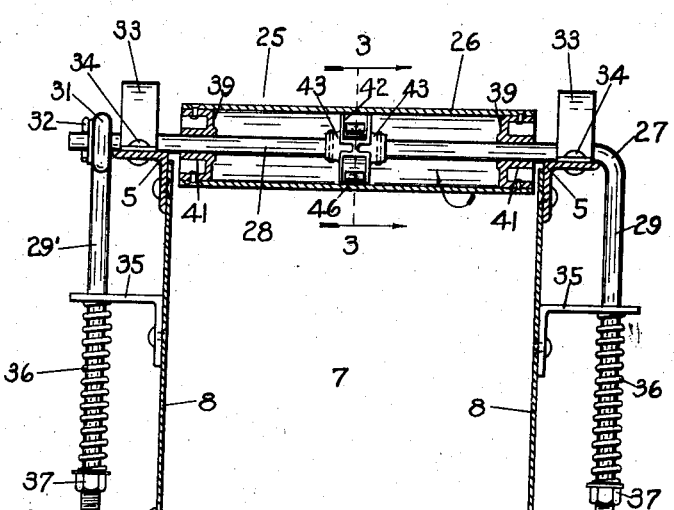
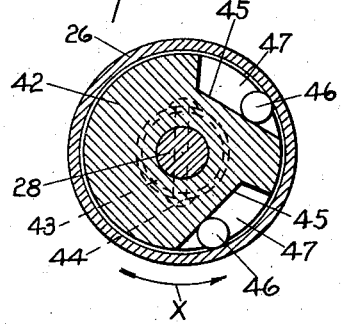
Witness
A. D. McLean
Inventor
Alvah E. Rutter,
by John L. Jackson.
Attorney Patented June 30, 1931

1,812,061

UNITED STATES PATENT OFFICE

ALVAH E. RUTTER, OF OTTUMWA, IOWA, ASSIGNOR TO DAIN MANUFACTURING COMPANY OF IOWA, OF OTTUMWA, IOWA, A CORPORATION OF IOWA

TUCKER FOR HAY PRESSES

Application filed January 3, 1928. Serial No. 244,078.

The present invention relates generally to tuckers for hay presses, such devices being commonly provided on baling presses for tucking in the projecting ends of the hay between successive charges.

More specifically, the invention pertains to a roller tucker and aims to provide an improved and simplified construction of supporting means for the roller, and an improved arrangement of clutch mechanism cooperating with the roller for preventing rotation thereof in one direction.

What I regard as new is set forth in the appended claims.

In the accompanying drawings illustrating a preferred embodiment of my invention:

Fig. 1 is a fragmentary side elevational view of a hay press, illustrating the present tucker in operative position thereon.

Fig. 2 is a transverse sectional view through the baling chamber, taken on the plane of the line 2—2 of Fig. 1, the tucker roller being illustrated in longitudinal section; and Fig. 3 is a transverse sectional view of the roller taken on the plane of the line 3—3 of Fig. 2.

Referring to Fig. 1, wherein I have shown a conventional type of hay press for illustrating a typical adaptation of my improved tucker, 5 and 6 indicate upper and lower frame members of a series of four frame members defining a rectangular bale chamber 7, having side walls 8 and a bottom wall 9. Extending rearwardly in continuation of this bale chamber is an open rectangular frame defining the usual compressing chamber 7'. Upon the forward portion of the frame 5—6 is mounted gearing of any suitable arrangement for actuating the plunger and self-feeder. In the typical construction shown, 11 is a pulley with which any suitable operating power is connected by a belt 12. Upon the shaft 13 of this pulley is mounted a pinion which is in driving mesh with a large gear 14. The plunger, indicated at 15, is connected by bars 16 to a wrist pin (not shown) projecting from the side of the large gear. As this gear is revolved, the plunger 15 is caused to travel back and forth in the feed chamber portion of the baling case. A feeder arm 17 is pivoted at 18 upon brackets extending upwardly from the frame. A link 19 connects the feeder arm with the previously mentioned wrist pin on the large gear 14. Depending from the other end of the feeder arm 17 is a feeding head 21, the position of which, relative to the arm 17, is controlled by a link 22. The hay is inserted into the bale case through a hopper 23, having a feeding opening communicating with the top of the bale chamber and through which the hay is forced down into the latter. Mounted on the side walls of the bale case are the usual retaining dogs or stops 24 for engaging the hay in a manner well known.

As above remarked, the hay press just described is merely representative of any conventional type of hay press, shown for the purposes of illustrating a typical adaptation, it being understood that the present tucker is adaptable to practically any type of press.

This tucker, indicated in its entirety at 25, is mounted on the top of the frame or bale chamber 7, just at the end of the feed opening through which the hay is forced from the hopper 23 into the bale chamber. The tucker comprises a roller 26 and an inverted U-shaped supporting member or bail 27 on which the roller is rotatably mounted. Such bail comprises a horizontally extending shaft portion 28, on which the roller 26 is rotatably mounted, and two downwardly extending arms 29 and 29'. The shaft portion 28 is preferably formed integral with the arm 29, both consisting of an L-shaped section of rod. The opposite arm 29' has an eye 31 formed at its upper end, which engages over the end of the shaft portion 28, being held in place thereon by a cotter pin 32 extending through a hole in the shaft portion. The bail is guided for vertical reciprocatory movement in two inverted U-shaped guide brackets 33, which have outwardly extending flanges 34 secured to the top flanges of the frame bars 5. The shaft or axle portion 28 of the supporting bail extends through these guides and is free to rise and fall therein, the arms 29—29' having sliding guided engagement in angle brackets 35 which extend outwardly from the side walls 8 of the bale case. Compression springs 36 are mounted on these arms, being confined between the under sides of the brackets 35 and nuts 37 which screw over the lower threaded ends 38 of the rods 29—29'. Such springs normally tend to move the tucker roller 26 downwardly into the bale case, the lowermost position of the roller being determined by the shaft portion 28 engaging the upper flanges of the frame bars 5. When the roller is in this lowermost position, its lower periphery extends down slightly into the path of the plunger 15. It will be evident that by adjusting the nuts 37 upwardly or downwardly along the threaded portions 38 of the bail arms a greater or lesser pressure can be exerted on the tucker roller, tending to force the same downwardly into the bale case.

The roller consists of a hollow cylinder having its ends closed by drums or heads 39 which are pinned or otherwise secured therein. These heads have relatively long bearing hubs 41 which afford extensive bearing support for the cylinder on the shaft 28. The mechanism for preventing rotation of the roller in one direction is completely enclosed within the roller, being preferably disposed substantially centrally between the end heads 39. I shall refer to such mechanism as an "over-running clutch", such being the term frequently employed to describe this type of mechanism. In the preferred construction shown, such mechanism comprises a hub or boss 42 having an axial opening therein through which the shaft portion 28 extends (Fig. 3). As shown in Fig. 2, hub portions 43 extend laterally from the member 42 for receiving transverse pins 44 which pass through the shaft 28 and which non-rotatably secure the member 42 to the shaft 28. The circular periphery of the member 42 is spaced slightly from the inner wall of the cylinder 26 to avoid frictional wear between these parts. Referring to Fig. 3, a plurality of tapering pockets 45 are formed in the peripheral portion of the member 42, there preferably being two of these pockets located substantially at the points shown, each pocket being of increasing radial depth in a direction corresponding to the direction of free rotative movement of the roller 26. Disposed in these pockets are clutch elements 46 which are free to roll from end to end of each pocket. Such clutch elements consist of balls or of cylindrical rollers, either type being optionally employed. Accordingly, in my reference to the clutch mechanism as a "ball clutch" it will be understood that I am employing this term in its broadest sense to include the use of either balls or rollers. Each pocket 45 has side walls 47 which prevent endwise displacement of the balls or rollers from the stationary clutch member 42. The arrow $x$ in Fig. 3 indicates the direction of free rotative movement of the tucker roller 26, and it will be observed that the two pockets 45 are so arranged that gravitational force acting on the clutch elements 46 will tend to roll these clutch elements downwardly towards the shallow ends of the pockets, in a direction counter to the direction of free rotative movement of the tucker roller. Rotation of the tucker roller in the direction indicated will merely result in the clutch elements 46 playing idly between the inner surface of the roller and the lower ends of the pockets 45. When, however, the tucker roller starts to revolve in the opposite direction the clutch elements will be forced into wedging engagement between the inner surface of the roller and the shallow ends of the pockets 45, thus holding the roller against such rotation by the frictional or wedging pressure which the clutch elements establish between the roller and the stationary clutch member 42.

Referring now to the operation of the tucker, the clutch mechanism above described is so arranged that in the forward stroke of the plunger 15, the tucker roller will revolve freely as the hay is forced under the same. At this time the springs 36 will force the roller yieldingly downwardly against the top of the charge of hay being compressed, permitting upward reciprocatory movement of the roller as the plunger passes below the same. In the retractive movement of the plunger the roller will move down behind the compressed charge of hay under the action of the springs 36, thus turning downwardly or tucking in the ends of the hay projecting from the upper part of this charge. In such retractive movement of the plunger, the clutch mechanism comes into operation for holding the roller against rotation in the opposite direction, which aids in tucking in the projecting ends of the hay and preventing such from being drawn back backwardly by the retractive movement of the plunger. In the next forward stroke of the plunger the tucked-in ends will be compressed between the previous charge and the new charge being forced forwardly by the plunger.

It will be noted that by housing the clutch mechanism within the roller, a simple compact construction is obtained, and one in which there is no possibility of hay or chaff becoming entangled or clogged in the clutch parts and thereby fouling the operation thereof. This is an advantage of considerable importance, as in prior constructions employing ratchet mechanism at the end of the roller there is always a tendency for such ratchet mechanism to become clogged with hay. The assembly of the roller on the shaft 28, and the mounting of the entire device on the bale chamber, are facilitated by making the depending arm 29' separable from the shaft portion 28. After the stationary clutch member 42 has been secured to the shaft 28, and the clutch elements 46 have been placed in the pockets 45, the roller 26 is slid endwise over the clutch mechanism, and thereafter the open end of the roller is closed by the end head 39.

What I claim as my invention and desire to secure by Letters Patent is:

1. A tucker adapted for association with the bale chamber of a hay press, comprising a hollow roller, non-rotatable means supporting said roller so that it can move inwardly and outwardly relatively to said bale chamber, heads closing the ends of said roller, and means carried by said non-rotatable means confined within said roller between said heads cooperating with the roller for preventing rotation of the latter in one direction.

2. A tucker adapted for association with the bale chamber of a hay press, comprising a roller, non-rotatable vertically movable supporting means for said roller, and an over-running clutch completely housed within said roller having stationary clutching stop means secured to said supporting means cooperating with said roller for preventing rotation thereof in one direction.

3. A tucker adapted for cooperation with the bale chamber of a hay press, comprising a roller, a shaft extending through said roller, vertically movable supporting means for said shaft holding the latter against axial rotation, and an over-running clutch mounted on said shaft and engaging the inner circumference of said roller for preventing rotation thereof in one direction.

4. A tucker adapted for mounting on the bale chamber of a hay press, comprising a roller, a shaft held against axial rotation and on which said roller is revolvably mounted, supporting means for said shaft, movable substantially vertically and an overrunning clutch effective between said shaft and said roller for preventing rotation of the latter in one direction, said clutch comprising a clutch member secured to said shaft and having a tapered pocket therein, and a clutch element adapted to roll in said pocket and to have frictional wedging engagement between said pocket and the inner circumference of said roller.

5. A tucker adapted for mounting on the bale case of a hay press, comprising a roller, a shaft on which said roller is rotatably supported, one end of said shaft being bent downwardly on the outer side of said bale case to form a depending arm, a depending arm at the opposite side of said bale case having an eye linked to the opposite end of said shaft, inverted U-shaped guides on said bale case in which said shaft is free to move substantially vertically, brackets projecting from said bale case and affording guides for said depending arms, and springs mounted on said arms between said brackets and nuts screwing over the lower ends of said arms.

6. A tucker adapted for association with the bale chamber of a hay press, comprising a roller adapted to engage the hay directly, a reciprocatory bail-shaped supporting member on which said roller is rotatably mounted, and an over-running clutch having stationary clutching stop means securely fastened to said bail-shaped supporting member cooperating with said roller for preventing rotation of said roller in one direction.

7. A tucker adapted for association with the bale chamber of a hay press, comprising a one-way brake device, movable non-rotatable supporting means for said brake, said brake comprising a tucker roller member loosely carried by said supporting means, a stationary brake member secured to said non-rotatable supporting means, and braking elements cooperating between the aforesaid members for preventing rotation of the roller member in one direction.

8. A tucker adapted for cooperating with the bale chamber of a hay press, comprising a brake, vertically movable non-rotatable supporting means for said brake, said brake comprising a tucker roller member having closed ends, said roller member being loosely journaled on the supporting means, a stationary brake member keyed to said supporting means, and braking elements carried by said stationary brake member contacting the inner periphery of the upwardly moving side of the roller member, solely cooperating between the aforesaid members for stopping rotation of the roller member in one direction, and said closed roller member comprising a housing means for shielding said braking elements from hay and other foreign materials.

ALVAH E. RUTTER.